Figure 1:
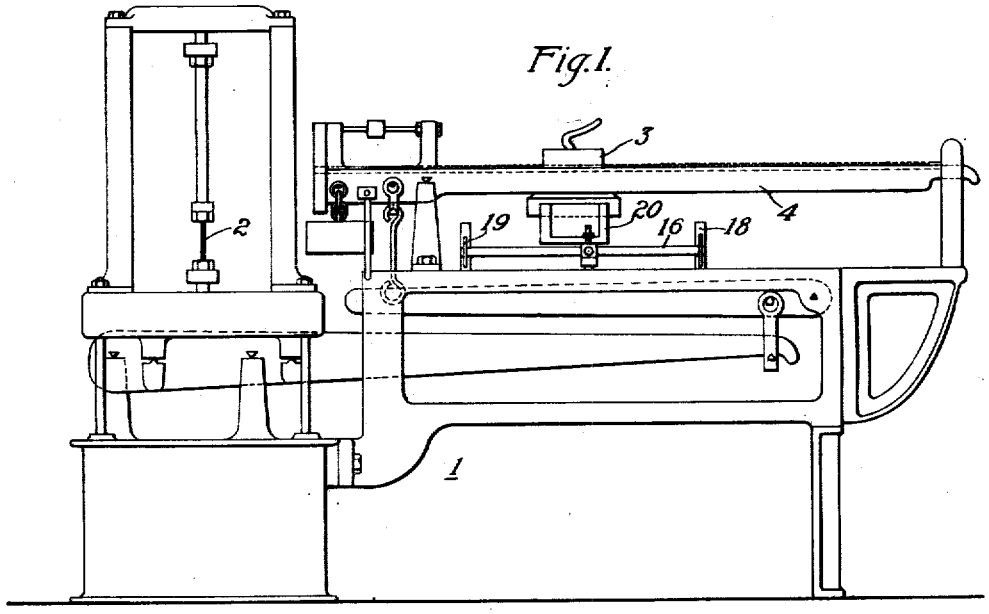

Oct. 16, 1923.

C. H. MARSHALL, JR 1,470,691

RECORDING DEVICE

Filed Dec. 13, 1919

WITNESSES:
H.T. Shelhamer
W.H. Woodman.

INVENTOR
Charles H. Marshall, Jr.
BY
Wesley G. Carr
ATTORNEY

Patented Oct. 16, 1923.

1,470,691

UNITED STATES PATENT OFFICE.

CHARLES H. MARSHALL, JR., OF WILMERDING, PENNSYLVANIA, ASSIGNOR TO WESTINGHOUSE ELECTRIC & MANUFACTURING COMPANY, A CORPORATION OF PENNSYLVANIA.

RECORDING DEVICE.

Application filed December 13, 1919. Serial No. 344,605.

*To all whom it may concern:*

Be it known that I, CHARLES H. MARSHALL, Jr., a citizen of the United States, and a resident of Wilmerding, in the county of Allegheny and State of Pennsylvania, have invented a new and useful Improvement in Recording Devices, of which the following is a specification.

My invention relates to recording devices and, more particularly, to recording devices for use in connection with certain types of testing machines, and its has, for its object, the provision of a recording device which may be conveniently operated in such manner that a single person may conduct tests which previously required the cooperation of two or more persons.

More particularly, my present invention relates to a recorder for use when measuring the elastic limits of test pieces by the employment of testing machines, such as those of the well known Olsen type, with which a constantly increasing load is applied to the test piece by a poise moving along a graduated beam.

In the past, elastic-limit determinations have required the attention of two or more operators, one operator usually reading the elongation of the test piece by an extensometer, another operating the testing machine and reading, from the beam, the load applied to the test piece and a third recording the readings made by the other two. By my invention, I provide a semi-automatic recording device of such character that one person, while operating the testing machine, may read the elongation of the test piece by use of the extensometer and may also record the loads applied to the test piece at times of predetermined elongations.

Another object which I have in view is to provide a recording instrument which will produce a permanent record by forming perforations in a graduated card or chart by means of a prick-punch and to so arrange the operating mechanism of the punch as to in no way interfere with the testing machine as a whole.

Another object which I have in view is the provision of a recording device which shall be simple in construction and readily applicable to testing machines as now constructed.

With these and other objects in view, my invention will be more fully described, illustrated in the drawings, in the several views of which corresponding numerals indicate like parts, and then particularly pointed out in the claims.

Figure 2:
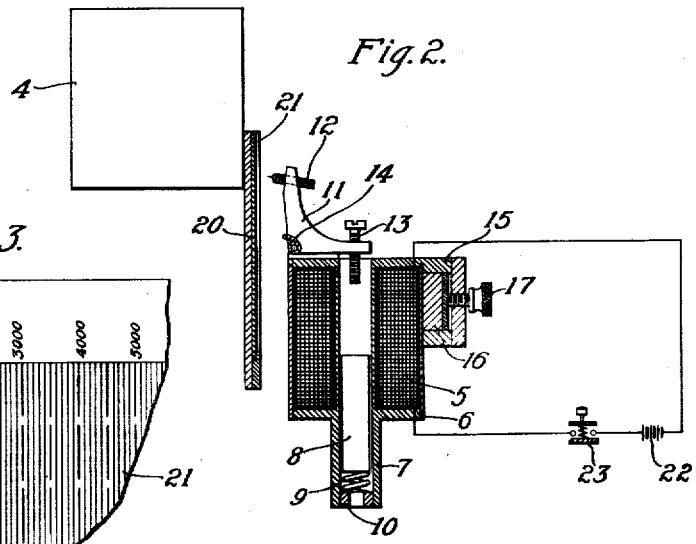
Figure 3:
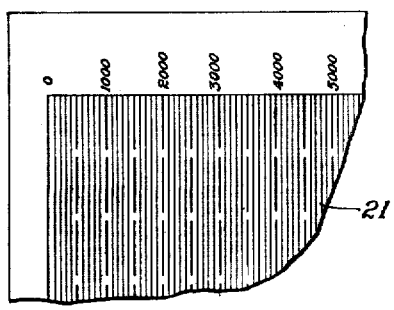

In the drawings, Fig. 1 is a front elevation of a well known form of testing machine, showing my invention applied thereto; Fig. 2 is a vertical sectional view of my recording device, and Fig. 3 is a fragmentary view of a record chart or card employed with it.

In order to ensure a clear and accurate understanding of my invention, I have illustrated it in connection with a testing machine 1 of the well known Olsen type, in which a test piece 2 is subjected to constantly increasing load by the movement of a poise 3 along a graduated beam 4. Means is provided for steadily moving the poise along the beam, and an extensometer (not shown) is commonly mounted in operative relation to the test piece in order that its elongation may be accurately noted. These features, however, form no part of my present invention and no description of them is necessary for the information of those skilled in the art.

Referring more particularly to Fig. 2 of the drawing, my invention may comprise a solenoid 5 enclosed within a suitable casing 6 provided, at its lower end, with a tubular extension 7 to normally support the loosely fitting armature or plunger 8. A light helical spring 9 may comprise a yielding seat for the plunger and may be adjustably held in place by a screw-plug or equivalent means 10. Pivoted upon the top of the casing 6 is a bell-crank lever 11 in one arm of which is adjustably screwed a prick-punch 12 and in the other arm of which is mounted an adjusting screw 13 which, in a normal position of the lever, projects axially of the solenoid. A light spring 14 may be mounted about the pivot pin of the lever to normally hold the lever in the position shown in Fig. 2 and to return it to such position after it has been actuated through movement of the plunger 8.

The casing 6 of my device, at the side opposite the lever 11, may be provided with a guideway 15 in order that the device may be slidably mounted upon a supporting bar 16 to which it may be clamped in adjusted position by a set screw 17. Spaced brackets or supports 18 may be mounted upon the frame of the testing machine 1 and may be provided with vertically spaced openings to receive supporting pins 19 which may be passed through the end portions of the bar 16 in order that the bar, and the recording device supported thereon, may be adjusted vertically, relative to the poise 3.

A substantially rectangular chart holder or frame 20 may be secured to the lower portion of the poise and may detachably receive a recording card or chart 21, of any suitable character, in such manner that energization of the solenoid will actuate the punch to perforate the card. One face of the card may be graduated to correspond to the graduations of the beam while the other face may be left blank for written records after the test has been conducted.

The solenoid winding may be connected in series with any suitable source of energy, such as a battery 22, and, with a manually operable switch 23, which may be mounted at any convenient point, preferably at a point near the test piece in order that the person reading the elongations of the test piece, with an extensometer, may control the operation of the recorder.

When using the recorder, the test piece or specimen is placed in the testing machine, in the usual manner, with the extensometer (not shown) in position. A card is then placed in the holder 20 and fastened in any manner so that it cannot shift. The poise is then set, so that the beam reads zero load, and the recorder is moved along the supporting bar 16 until, when the solenoid circuit is closed, a punch mark is formed on the zero line of the card. The recorder is then clamped in this position and the machine is started, with the operator standing at the extensometer. When the extensometer shows predetermined elongations of the test piece, the operator closes the switch. Inasmuch as the card attached to the poise is moving in front of the recording device, which is stationary, and as the card is graduated to correspond to the beam, the punch marks formed by closing the switch will indicate the loads at which the elongations are measured.

This operation may be continued until the elastic limit of the test piece has been passed, after which the extensometer is removed and the yield point is determined. The test is completed in the usual manner and the record may be made upon the back of the card. If desired, the card may be provided with a series of graduations so that a number of records may be made upon a single card by raising the recording device relative to the card holder.

The actual operation of the recording device itself is extremely simple and no description thereof is necessary. It should be noted, however, that the screw 13 is so adjusted that its lower or inner end is slightly above the adjacent end of the plunger 8 when the latter is centered within the solenoid. As a result, it is engaged by the plunger only because of the movement of the latter past its central position, due to inertia, so that the plunger merely gives a light, sharp hammer blow to the screw and immediately falls back out of engagement therewith, even though the circuit remains closed. For this reason, as soon as the punch has been checked, through engagement with the chart or card, the spring 14 may return the punch and its supporting lever to normal position so that they will not be injured by the movement of the card along the beam.

Although I have described my invention in considerable detail and have shown it as applied to a machine of particular type, it will be appreciated that no limitations are to be imposed upon my invention, or the manner of employing it, other than those indicated in the appended claims.

For example, the punching device may be movably mounted and the recording card may be held in fixed position. Furthermore, the recording element may operate a printing or marking attachment instead of piercing a hole in the record. The recording device may also be applied in connection with various machines, such as graphic meters, etc.

I claim as my invention:—

1. A recording device comprising a solenoid coil, a loosely fitting armature therein, a pivotally mounted lever engageable by the armature upon energization of the coil, and recording means carried by the lever.

2. A recording device comprising a solenoid coil, a casing therefor, a loosely fitting armature, a lever pivoted upon the casing, recording means mounted at one end of the lever, and means at the opposite end of the lever spaced from the armature when the latter is centralized in the coil but engageable by the structure during the overtravel of the latter immediately following energization of the coil.

3. A recording device comprising a pivoted lever, recording means carried by the lever, and electrically actuated means temporarily engageable with the lever.

In testimony whereof, I have hereunto subscribed my name this 8th day of December, 1919.

CHARLES H. MARSHALL, Jr.

Certificate of Correction.

It is hereby certified that in Letters Patent No. 1,470,691, granted October 16, 1923, upon the application of Charles H. Marshall, jr., of Wilmerding, Pennsylvania, for an improvement in "Recording Devices," an error appears in the printed specification requiring correction as follows: Page 2, line 109, claim 2, for the word "structure" read *armature;* and that the said Letters Patent should be read with this correction therein that the same may conform to the record of the case in the Patent Office.

Signed and sealed this 22d day of January, A. D., 1924.

[SEAL.] KARL FENNING,

*Acting Commissioner of Patents.*